E. W. SERRELL.
SPRING SUSPENSION FOR VEHICLES.
APPLICATION FILED JUNE 5, 1913.

1,188,684.

Patented June 27, 1916.

Witnesses:

Inventor:

UNITED STATES PATENT OFFICE.

EDWARD WILLIAM SERRELL, OF CHABEUIL, FRANCE.

SPRING SUSPENSION FOR VEHICLES.

1,188,684. Specification of Letters Patent. Patented June 27, 1916.

Application filed June 5, 1913. Serial No. 771,831.

*To all whom it may concern:*

Be it known that I, EDWARD WILLIAM SERRELL, a citizen of the United States, at present residing in Chabeuil, France, (whose post-office address is Pearl River, Rockland county, New York,) have invented a new and useful Improvement in Spring Suspensions for Vehicles, of which the following is a specification.

This invention relates broadly to spring-suspension structures for vehicles and the like.

The object of the invention is greatly to improve the action of the spring-structure of vehicles whereby the supporting springs thereof may instantly, effectually and automatically be adjusted to meet any change of load or various forms of stress thereon.

Another object within the contemplation of this invention is so to aggroup the several parts of the structure that progressively-increasing resistance of the supporting spring is afforded to accord with its flexure—wherefore a far more sensitive spring may be employed than is usually considered possible—not only for absorbing the minor jars and shocks transmitted thereto but, also, the heavy shocks which frequently occur as the vehicle traverses more or less uneven road-surfaces, since the structure readily adapts itself to absorb the same smoothly and effectually and without danger of producing sudden rebound of the vehicle-body as it rises when the stress is relieved.

Another object is to provide for effective control of the relative movement between the vehicle-body and the axles, no matter how great may have been the extent of the suddenness or extent of flexure imposed upon the spring.

This invention in general seeks to provide a spring structure which is particularly adapted for use in vehicles that are used on roads of more or less uneven surface, and which structure, from an operative standpoint, will in practical use possess a high degree of efficiency and durability and which, structurally considered, will be of the greatest possible simplicity.

Other objects and advantages will in part be obvious from the annexed drawings and will also in part be pointed out in the following description.

The invention resides, broadly, in the features of construction, combinations of elements, and arrangements of parts, and in various aggroupments thereof, all as will be exemplified in the construction hereinafter set forth, and the scope of application of which will be indicated in the appended claims.

The accompanying drawings, referred to herein and constituting a part hereof, illustrate embodiments of the invention, the same serving in connection with the description herein to explain the principles of the invention.

Figure 1:
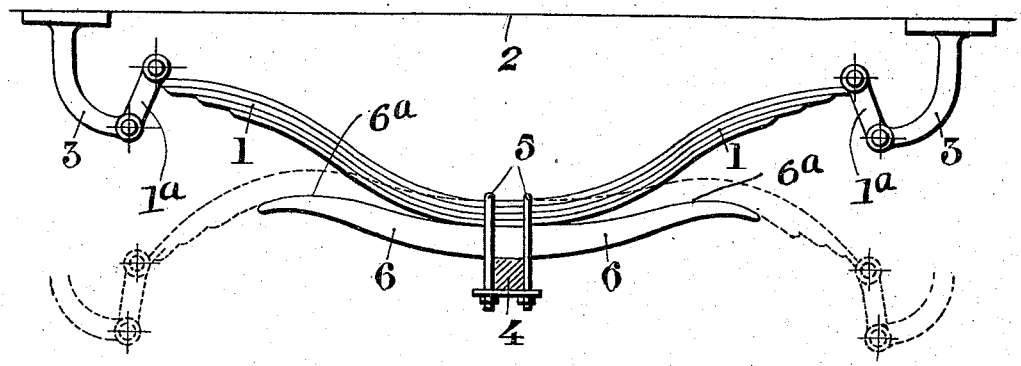
Figure 2:
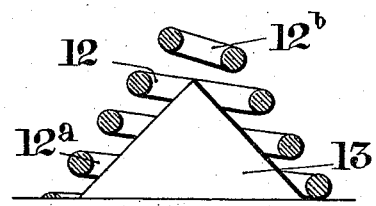
Figure 3:
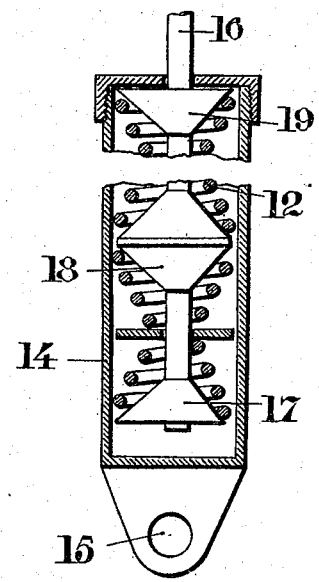
Figure 4:
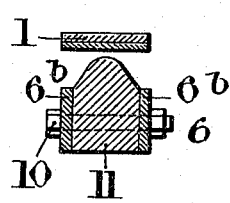

In the drawings: Figure 1 is a view in elevation (partly in section) of a spring suspension system constructed in accordance with one embodiment of the invention; Fig. 2 is a fragmentary view in sectional elevation of a spring-structure constructed in accordance with a different embodiment of the invention; Fig. 3 is a similar view illustrating another embodiment of the invention; and Fig. 4 is a view in central vertical transverse section of a modified form of structure.

In these drawings, the reference-numeral 1 designates a spring composed, preferably and as shown, of a plurality of leaves or plates of relatively different dimensions, but of a length greater than those usually embodied in vehicle springs, and this for a purpose presently to be explained. The spring is normally arranged in juxtaposition to the vehicle-body 2, and may be connected thereto in any appropriate manner. I prefer, however, pivotally to attach to it (at its opposite ends) links 1ª which, in turn, are pivotally connected to goose-neck hangers 3 depending from the bottom of the vehicle-body 2. Also attached to the spring, intermediate of its ends, is an axle 4, the means of securement thereof being in this instance, in the form of clamps 5. It is desirable that suitable means shall be provided for controlling the action of said supporting-spring 1 throughout its length, that is, from the points of its attachment to the axle 4 to near its ends: A preferred form of controlling means is what I herein designate a "cradle" or "cradle-device" 6. This is of a length less than that of the lowermost leaf of the spring. In other words, all of the leaves of the spring are of a length greater than that of the cradle, so that their opposite ends extend beyond the corresponding ends of the cradle. By such a construction and relative arrangement, the action of predetermined portions of the spring may be governed practically.

The cradle may be in the form of an elongated member such as that shown in Fig. 1; and is preferably curved so as to present a bearing-surface 6ª and, thus, provide a plurality of contact-points for the overlying spring as the latter is depressed toward and into engagement therewith. It will be observed that in the form illustrated, the surface of the cradle 6 has a central curvature rising on each side of the axle 4, and also end curves extending therefrom outwardly and in a downward direction. This construction permits full flexure of the spring and practically its inversion upon the cradle, as indicated by the dotted lines in the said Fig. 1.

The cradle operates as a controlling means in the following manner: Assuming that the stiffness of the spring is naturally such that when the vehicle is at rest or running over a comparatively smooth surface and carrying a normal load, the spring will contact against the bearing-surface of the cradle only adjacent the clamps 5: There is, then, a well-defined space between the bearing-surface of the cradle and the lower face of the spring, as shown in full-lines in Fig. 1. Manifestly, under such conditions, a considerable portion of each end of the spring is free and bendable and presents an instrumentality having a large area of flexibility. Now, to the extent that the free portion is engaged by the cradle will the area of flexibility be reduced, and those portions thereof in engagement with the cradle will be governed to an appreciable and desirable degree, while the portions still free to bend will afford the necessary flexibility to take up shocks, etc. By reason of the fact that a considerable portion of the spring is normally spaced from the cradle, it will be seen that when the parts occupy the position shown in full-lines in Fig. 1— when nearly the entire spring is free to bend—the degree of flexibility is much greater than in ordinary spring structures.

The high degree of flexibility of the spring which I am enabled to employ as a part of my improved spring structure is exceedingly important because it affords a medium for absorption not only of minor shocks and jars but, also, heavy shocks, no matter what may be the degree of flexure of the spring. Therefore, as the spring can with safety and advantage be extremely flexible, it will, as soon as there is action thereon, with increased flexure caused by shock or from overload, engage more and more with the bearing-surface of the cradle, the points of contact therewith gradually increasing from near the clamps 5 outwardly toward the ends of the cradle 6. Obviously, only those portions of the spring which are, at any particular moment, out of contact with the bearing-surface of the cradle are free to bend downwardly beyond the positions previously occupied, and in this manner the bendable portions of the spring become reduced as the spring engages more and more with the bearing-surface of the cradle. In consequence, the resistance to flexure of the springs increases quite rapidly at certain points of its action; and such resistance to flexure progressively increases. By proper proportioning of the parts, the production of a progressively-increasing resistance is made to correspond with the requirements of any particular application of the system. Manifestly, when the entire bearing-surface of the cradle is engaged by the spring, as shown in dotted lines in Fig. 1, there are still bendable portions of the spring beyond the ends of the cradle which will, then, operate to absorb shocks and jars. In some instances, it is desirable to form the bearing-surface of the cradle so that it will facilitate the throwing off of mud and the like that ordinarily would at times lodge thereon: In Fig. 4, I have illustrated a preferred form; and in this instance the cradle comprises side plates 6ᵇ, 6ᵇ, with an interposed body 11 of wood, leather, or other suitable material, and so formed, as in the construction shown in Fig. 1, as to provide the bearing-surface 6ª.

It is evident, as already hereinbefore suggested, that my invention is susceptible of modification and I have herein, in Figs. 2 and 3, illustrated two of such specifications.

In Fig. 2, there is shown an adaptation of my invention which employs a coil spring 12. In this instance, the spirals or coil-portions 12ª of the spring are of greater diameter and are more flexible than the spirals or coil-portions 12ᵇ. Positioned within the several coil-portions of the spring is a lining cone 13 of such form that the larger coils 12ª will first bear upon it when the spring is tensioned under pressure; and, then, the spring as a whole will be given a progressive resistance as its various portions engage the lining.

In Fig. 3, I have illustrated a carrying forward of the embodiment of Fig. 2, and in this instance the springs are formed and arranged in series in a casing 14 provided at its lower end with an apertured ear 15 and, at its upper end, with a tension-rod 16. As shown, the rod 16 carries a fixed cone 17 at its lower extremity, an intermediate double cone 18, and a cone 19 at the upper end of the casing 14. The cones 18 and 19 are free to slide on the rod 16. The springs encircle the rod 16 between the cones which act as cradles for the spring. It will be evident that, in this form of device, as in those already described, the cones constitute a progressively-resisting instrumentality for the springs which, according to their form, may act either in compression or tension.

From the foregoing, it will be perceived that I have succeeded in devising a spring suspension structure which is well adapted to achieve the several objects and ends in view. The structure is exceedingly simple and compact in form, is particularly well suited for road vehicles like automobiles, and the parts of it are so constructed as to permit of its application to existing forms of vehicles.

As many changes may be made in the above constructions, and many apparently widely different embodiments of this invention can be made without departing from the scope thereof, it is intended that all matter contained in the foregoing description and shown in the accompanying drawings shall be interpreted as illustrative and not in a limiting sense. It is, therefore, to be understood that the language used in the following claims is intended to cover all of the generic and specific features of the invention which, as a matter of language, might be said to fall therebetween.

I am aware that it has heretofore been proposed to include, in a spring suspension structure, a rigid member adapted to check the action of the spring during rebound of the suspended parts; and in some instances counter-springs operating in opposition to the main spring have been utilized; but I do not herein claim any such construction.

What I claim is:

1. In a spring suspension for vehicles, the combination with the axle and the frame, of a cradle transverse to the axle having a central surface curvature rising on opposite sides of the latter and end curves running outwardly and in a downward direction therefrom, a semi-elliptical spring of greater length than said cradle bearing thereon at its center in a same longitudinal plane, the ends of said spring being capable of flexure downwardly along and below the curved ends of the cradle, hangers secured to the frame beyond said spring ends, and links between said hangers and the spring ends permitting full flexure of the spring within the hangers and adjacent to the frame.

2. The combination with the axle of a vehicle and the vehicle frame, of a semi-elliptical spring having a plurality of leaves of different lengths progressively increasing in an upward direction and lying adjacent to the frame crosswise of the axle collectively, a cradle of less length than the lowermost leaf of said spring interposed between the axle and said leaf in a same plane lengthwise of the vehicle, said cradle having a central surface curvature rising forwardly and rearwardly of the axle, and end curves extended therefrom turning in a downward direction, the middle portion of the spring being lodged within said curvature of the cradle and the spring ends adapted to be flexed downwardly along and below the cradle ends, links at the opposite extremities of the uppermost leaf of the spring, and hangers on the frame suspending it directly from said links.

In witness whereof I have signed this specification in the presence of two witnesses.

EDWARD WILLIAM SERRELL.

Witnesses:
 JEAN GERMAIN,
 MARIUS MERMAZ.

Copies of this patent may be obtained for five cents each, by addressing the "Commissioner of Patents, Washington, D. C."